United States Patent Office 3,186,847
Patented June 1, 1965

3,186,847
COMPOSITION OF GELATIN AND HARDENING AGENT
Jozef Frans Willems, Wilrijk-Antwerp, and Marcel Nicolas Vrancken, Berchem-Antwerp, Belgium, assignors to Gevaert Photo-Producten N.V., Mortsel, Belgium, a Belgian company
No Drawing. Filed Apr. 27, 1961, Ser. No. 105,909
Claims priority, application Belgium, Apr. 29, 1960, 39,743, Patent 590,302
3 Claims. (Cl. 96—111)

The present invention relates to an improved method for hardening proteins and proteinaceous substances, more particularly gelatin, and especially for the hardening of photographic gelatin layers.

It is generally known to harden soluble or fusible macromolecular products after shaping which allows one to combine the special properties of the starting materials with a lower solubility and a higher thermostability.

Thus while using gelatin in photographic emulsion layers, it is important to harden the gelatin in order to render it more resistant to warm aqueous solutions with widely varying pH-values. Indeed, an unhardened gelatin layer softens already at 30° C. and loses then its firmness, whereas gelatin-containing emulsion layers have to be resistant to treatments at relatively high temperatures in successive baths which widely vary in pH.

In case the starting materials are proteinaceous, such as, e.g., gelatin, casein, zein, collagen, they may be hardened by a treatment with metal salts of organic compounds whereby the finished material is characterized by a lower solubility, a lower water-absorption and a higher thermostability.

As metal salts may be mentioned, e.g., chromium, aluminum and zirconium salts.

As organic products known in this connection may be cited, e.g., aldehydes such as formaldehyde, acetaldehyde, acrolein, glyoxal and derivatives thereof, mixtures of an aliphatic aldehyde and an aromatic compound, the nucleus of which bearing at least one hydroxyl group such as phenol, resorcinol and resorcyl aldehyde; compounds having two or more reactive groups which thus can crosslink the polypeptide chain, such as diketones, polyanhydrides, polyepoxides and compounds having at least two ethylene-imino groups (Belgian patent specification 575,440, filed February 6, 1959); reaction products of macromolecular compounds having amino- and/or hydroxyl groups with some classes of unsaturated aliphatic compounds having carboxyl groups (Belgian patent specifications 552,537, filed November 13, 1956; 565,859, filed March 20, 1958, and 565,862, filed March 20, 1958); high-molecular polysaccharides having secondary alcohol groups oxidized to aldehyde groups (Belgian patent specification 566,352, filed April 2, 1958); and well-defined classes of sulfofluorides (Belgian patent specifications 571,228 and 571,229, filed September 16, 1958).

With the hardening agents, known until the present, no satisfactory results are obtained. The metal salts have the property to react very quickly, so that by adding the required quantity for obtaining the desired hardening, there is always the risk that the protein solution will coagulate before coating or shaping.

Hardening agents, such as formaldehyde, are partly volatilized when drying the materials so that an accurate dosage is very difficult.

Moreover the known hardening agents generally act slowly, so that a long storage is necessary in order to attain a sufficiently stabilized state of hardening and/or require an intense heating to reach the necessary degree of hardening, which in case of using photographic silver halide emulsion layers may give rise to a reduction in sensitivity and to fog formation.

It has now been found that proteinaceous material may be hardened by incorporating therein one or more compounds of the following general formula:

$$FO_2S-Ar-A-A'-(CH_2)_n-X$$

wherein:

Ar represents any aryl nucleus;
A represents a single bond or a bivalent radical such as —NH— and —O—;
A' represents a carbonyl radical or a sulfonyl radical;
$n$ is a positive integer from 1 to 3, preferably 1 or 2;
X represents a halogen atom, such as a chlorine atom and a bromine atom.

The process provided by the present invention obviates all the aforesaid drawbacks. It is possible to obtain the required hardening by the addition of the new hardening agents to solutions of proteins, without influencing the physical properties of the solution before coating or during shaping.

As distinct from m-fluorosulfonyl aniline described in the Belgian patent specification 571,228 which only gives good results when used in well-defined types of emulsions, the compounds according to the present invention have the advantage that they can be used as hardeners for all types of emulsions; moreover, the concentration required for obtaining a well-defined degree of hardening is markedly lower.

The fluorosulfonyl group may be linked to any carbon atom of the aryl nucleus.

Some methods, stated hereinafter, relate to the preparation of products which can be used in the application of the process according to the present invention.

(1) *Preparation of N-2-chloropropionyl-m-fluorosulfonylanilide*

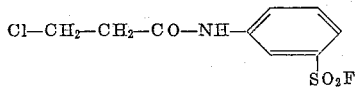

52.5 g. (0.3 mol) of m-fluorosulfonylaniline are dissolved in 200 cm.³ of anhydrous ether. A solution of 19 g. (0.15 mol) of chloropropionyl chloride dissolved in 150 cm.³ of anhydrous ether is then dropwise added thereto whereby immediately a white precipitate is obtained. The reaction mixture is then stirred for some further hours and next the formed precipitate is sucked off. The ether filtrate is distilled off and the resulted greasy residue is purified by recrystallization from diluted acetic acid. Melting point: 80° C.

(2) *Preparation of m-fluorosulfonyl fenacylbromide*

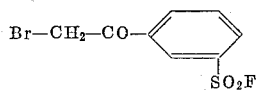

159.8 g. of bromine are slowly added to a solution of 202.2 g. of m-acetyl benzene sulfofluoride dissolved in 700 cm.³ of acetic acid. The reaction mixture is diluted with 3000 cm.³ of water and recrystallized from 400 cm.³ of benzene. Melting point: 108–110° C.

(3) *Preparation of N-chloroacetyl-m-fluorosulfonyl anilide*

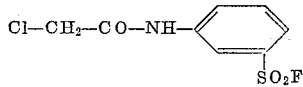

35 g. (0.2 mol) of m-fluorosulfonyl aniline are dissolved in 150 cm.³ of anhydrous ether. After a dropwise addition of 11.3 g. (0.1 mol) of chloroacetyl chloride in 100 cm.$^3$ of anhydrous ether, immediately a white precipitate is formed. The mixture is stirred for some further hours. Next, the formed precipitate is sucked off and washed with ether. Then the ether filtrate is distilled off and the residue obtained is recrystallized from a mixture of equal parts of alcohol and water and finally recrystallized from benzene. Melting point: 86° C.

(4) *Preparation of N-chloromethylsulfonyl-m-fluorosulfonyl anilide*

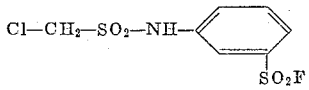

17.5 g. (0.1 mol) of m-fluorosulfonylaniline are dissolved in 60 cm.$^3$ of benzene and then a solution of 14.9 g. (0.1 mol) of chloromethyl sulfochloride in 40 cm.$^3$ of benzene is added thereto. After cooling the mixture to ±0° C., a solution of 7.9 g. (0.1 mol) of pyridine in 400 cm.$^3$ of benzene is dropwise added thereto. After stirring for some hours the reaction mixture is stored overnight. The two layers thus obtained are separated. The oil layer is dissolved into ether and filtered over active charcoal and then distilled off again. The residue is brought into benzene and the product is precipitated from the benzene solutions with petroleum naphtha and thereafter recrystallized from chloroform. Melting point: 108° C.

(5) *Preparation of N-bromoacetyl-m-fluorosulfonyl anilide*

17.5 g. (0.1 mol) of m-fluorosulfonyl aniline are dissolved in 100 cm.$^3$ of anhydrous ether. After dropwise adding thereto a solution of 10.05 g. (0.05 mol) of bromoacetyl bromide in 100 cm.$^3$ of anhydrous ether, immediately a white precipitate is formed. The mixture is stirred for some hours whereafter the precipitate is sucked off. The ether filtrate is evaporated and the residue thus obtained is washed with water and recrystallized from benzene. Melting point: 110° C.

For applying the method according to the present invention the compounds having the above mentioned formula may be added to the protein-solution, more particularly to the gelatin solution, or to a photographic emulsion before coating. They also can be absorbed by immersion of the proteinaceous mass in a solution of one of these products.

After drying the coated sheets, the layers etc. are stored for some time for allowing the hardening reaction to take place. In most cases a storage time of 2–5 days may suffice.

The pH of the mixture before coating or during storage also influences the hardening reaction. Although the hardening can even occur at a low pH, it is advantageous in the case of gelatin to utilize a neutral or slightly alkaline mixture for obtaining a rapid and intense hardening.

As circumstances may require (material to be hardened, required hardening, drying method, pH etc.), the amounts of hardening agent used according to the invention may vary within wide limits.

Mostly an amount of 1 to 5% based on the dry gelatin will suffice to obtain the desired effect. The gelatin layers according to the invention have a good resistance to scratching and a markedly lower swelling capacity. Moreover, they possess a considerably higher resistivity to mechanical damages and an increased softening or melting point in aqueous solutions. This is of the greatest importance for photographic emulsion layers and other gelatin containing auxiliary layers such as, e.g., protective layers, antihalation layers, backing layers, filter layers, etc. since the improvement of the physical properties permits a safe treatment of the photographic material in the different processing baths.

The following examples illustrate the present invention without limiting, however, the scope thereof.

EXAMPLE 1

To 100 cm.$^3$ of a 5% aqueous gelatin solution with pH 7 are added 5 cm.$^3$ of a 5% solution of N-2-chloropropionyl-m-fluorosulfonyl anilide in ethanol. The gelatin solution prepared in this way is coated onto glass plates, solidified and dried.

After a storage for 36 hrs. at 50° C., the gelatin layers thus obtained resist to a treatment in boiling water without losing their firmness.

EXAMPLE 2

To 100 cm.$^3$ of a 5% aqueous gelatin solution are added 3 cm.$^3$ of a 5% solution of m-fluorosulfonyl phenacylbromide in ethanol. The gelatin solution prepared in this way is adjusted to pH 7, coated onto glass-plates, solidified and dried.

After storing for 10 days the gelatin layers thus formed resist to a treatment in boiling water without losing their firmness.

EXAMPLE 3

To 100 cm.$^3$ of a 5% aqueous gelatin solution are added 5 cm.$^3$ of a 5% solution of N-chloromethylsulfonyl-m-fluorosulfonyl anilide in acetone. The gelatin solution is then adjusted to pH 7, coated onto glass-plates, solidified and dried. Already after a few days of storage at room temperature the thus formed gelatin layers resist to a treatment in water baths of 80° C. with widely varying pH-values.

EXAMPLE 4

(a) To 100 cm.$^3$ of a 5% aqueous gelatin solution are added 2 cm.$^3$ of a 5% solution of N-bromoacetyl-m-fluorosulfonyl anilide in ethanol. The gelatin solution is adjusted to pH 7, coated onto glass-plate, solidified and dried. Already after a few days storage these gelatin layers resist to a treatment in water of 80° C.

(b) To 1 kg. of photographic gelatino silver halide emulsion containing 80 g. of gelatin are added 80 cm.$^3$ of a 5% solution of N-bromoacetyl-m-fluorosulfonyl anilide in ethanol. This emulsion is coated onto film and dried. Already after a few days' storage the emulsion layer thus obtained resists to mechanical damaging during the treatment in photographic baths.

EXAMPLE 5

To 1 kg. of a high-sensitive photographic gelatino silver halide emulsion containing 80 g. of gelatine are added 40 cm.$^3$ of a 5% solution of N-chloroacetyl-m-fluorosulfonyl anilide in ethanol. The emulsion is coated onto film, solidified and stored for 15 days at room temperature. The treatment of the emulsion layer in an aqueous medium causes a little swelling and the layer resists much better to mechanical damaging than an emulsion layer to which no hardening agent has been added.

We claim:

1. A composition comprising gelatin containing therein 1–5% based on the weight of gelatin of a compound according to the general formula

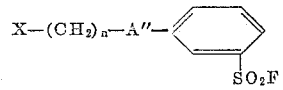

wherein:
X is a halogen atom selected from the group consisting of a bromine atom and a chlorine atom,
A″ is a bivalent organic radical selected from the group consisting of a —CO— radical, a —CONH— radical and a SO$_2$NH— radical, and
$n$ is a positive integer as from 1 to 2.

2. A photographic material comprising a support and a layer containing hardened gelatin on said support, the gelatin in said layer being hardened by the incorporation therein of about 1–5% of its weight of a compound according to the general formula

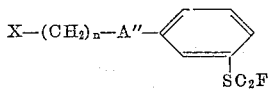

wherein:
   X is a halogen atom selected from the group consisting of a bromine atom and a chlorine atom;
   A″ is a bivalent organic radical selected from the group consisting of a —CO— radical, a —CONH— radical, and a —SO₂NH— radical; and
   n is a positive integer from 1 to 2.

3. The material of claim 2 wherein said layer is a light-sensitive gelatino silver halide emulsion.

References Cited by the Examiner
UNITED STATES PATENTS
2,691,582   10/54   Lowe et al. _____ 96—94
2,725,295   11/55   Allen et al. _____ 96—111

FOREIGN PATENTS
571,228   10/58   Belgium.
571,229   10/58   Belgium.

NORMAN G. TORCHIN, *Primary Examiner.*

HAROLD N. BURSTEIN, *Examiner.*